(12) United States Patent
Little et al.

(10) Patent No.: US 6,698,286 B1
(45) Date of Patent: Mar. 2, 2004

(54) METHOD OF BALANCING A DISK PACK USING SPINDLE MOTOR IMBALANCE AND DISK DRIVE INCLUDING A BALANCED DISK PACK

(75) Inventors: Aaron D. Little, Campbell, CA (US); John E. Scura, Paso Robles, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 29 days.

(21) Appl. No.: 10/262,466

(22) Filed: Sep. 30, 2002

(51) Int. Cl.[7] .............................................. G01M 1/16
(52) U.S. Cl. ...................................... 73/469; 360/98.06
(58) Field of Search ........................... 73/460, 461, 466, 73/467, 468, 469, 470, 471, 472, 473, 474, 475, 476, 477, 478, 479; 360/98.01, 98.07, 98.08, 99.05, 99.09, 99.12

(56) References Cited

U.S. PATENT DOCUMENTS

| 4,683,505 A | * | 7/1987 | Schmidt et al. | ........... 360/98.08 |
| 4,709,283 A | * | 11/1987 | Kitahara et al. | ........... 360/99.02 |
| 5,537,272 A | * | 7/1996 | Kazmierczak et al. | ... 360/99.08 |
| 5,824,898 A | | 10/1998 | Brooks et al. | ................. 73/469 |
| 6,101,876 A | * | 8/2000 | Brooks et al. | ................. 73/468 |
| 6,105,240 A | * | 8/2000 | Chuang et al. | ................. 29/729 |
| 6,418,612 B1 | * | 7/2002 | Chuang et al. | ........... 29/603.03 |
| 6,484,575 B2 | * | 11/2002 | Horning et al. | ............... 73/487 |
| 2003/0030936 A1 | * | 2/2003 | Smith et al. | ............. 360/77.04 |

FOREIGN PATENT DOCUMENTS

JP          10134502 A   *   5/1998   .......... G11B/19/20

* cited by examiner

Primary Examiner—Hezron Williams
Assistant Examiner—Rose M. Miller
(74) Attorney, Agent, or Firm—Won Tae C. Kim, Esq.; Milad G. Shara, Esq.; Stetina Brunda Garred & Brucker

(57) ABSTRACT

A method of balancing a disk pack for use in a disk drive according to an aspect of the present invention. The disk pack includes a spindle motor and a rotatable disk. The spindle motor is configured to rotate the disk about an axis of rotation of the spindle motor. The spindle motor has a spindle motor imbalance location indicia upon the spindle motor indicative of a location of a spindle motor location imbalance. The method includes detecting the spindle motor imbalance location indicia. The method further includes placing the disk upon the spindle motor. The method further includes attaching the disk to the spindle motor with the disk being off-set from the axis of rotation based upon the detected spindle motor imbalance location indicia for balancing the disk pack by producing a disk off-set imbalance in relation to the axis of rotation.

15 Claims, 7 Drawing Sheets

METHOD OF BALANCING A DISK PACK USING SPINDLE MOTOR IMBALANCE AND DISK DRIVE INCLUDING A BALANCED DISK PACK

CROSS-REFERENCE TO RELATED APPLICATIONS

Not applicable.

BACKGROUND OF THE INVENTION

1. Field of the Invention

The present invention relates generally to disk drives, and in particular to a method of balancing a disk pack using a spindle motor imbalance and a disk drive including a balanced disk pack.

2. Description of the Prior Art

The typical hard disk drive includes a disk drive base, and a head disk assembly (HDA) and a printed circuit board assembly (PCBA) attached to the disk drive base. The head disk assembly includes at least one magnetic disk, a spindle motor for rotating the disk, and a head stack assembly (HSA) that includes at least one transducer head, typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The spindle motor typically includes a spindle motor base, a central shaft, a rotatable spindle motor hub, a stator, a magnet attached to the hub, and vertically spaced upper and lower ball bearing sets mounted upon the central shaft which facilitate rotational attachment of the hub to the spindle motor base. Each ball bearing set includes inner and outer ball bearing races which encase a plurality of ball bearings. The inner ball bearing races engage the central shaft and the outer ball bearing races engage the hub. This configuration allows for rotational movement of the outer ball bearing races relative to the inner ball bearing races for rotation of the hub. The hub further includes an outer flange which is used to support one or more of the disks. The upper and lower ball bearing sets are preloaded in compression to maintain the hub and the disks supported on the hub in an orthogonal configuration with respect to the central shaft. The stator includes a series of coils and is concentrically positioned about the central shaft, adjacent the hub. With this general configuration, the various coils of the stator are selectively energized to form an electromagnetic field that pulls/pushes on the magnet otherwise associated with the hub, thereby imparting a rotational motion onto the hub. Rotation of the hub results in the rotation of the attached disks.

The various rotating elements associated with the disks may be referred to as a disk pack. This may include not only the disks, but also the rotating portions of the spindle motor, the spacers, the disk clamp and disk clamp screws. It is crucial that the mass of the disk pack is balanced so as to minimize dynamic vibrations during operation of the disk drive. The greater the magnitude of the imbalance is contemplated to degrade the disk drive performance not only in terms of read/write errors, but also seek times. A significant amount of imbalance may even result in damage or excessive wear to various disk drive components.

There have been various prior art attempts to balance the disk pack. For example, one method is described in U.S. Pat. No. 5,824,898 (incorporated herein by reference). According to this method, the disk drive is assembled with the disks being attached to the spindle motor with a disk clamp. However, the disk clamp screws are only slightly torqued so as to loosely couple the disks to the spindle motor. The spindle motor is then activated to rotate and a sensor is used to detect an imbalance location of the disk pack. The disk pack is then impacted by a solenoid hammer based upon the detected imbalance location. This process may be repeated as necessary. As a result the disks may be shifted in location so as to reduce the amount of imbalance. Such a method, however, requires that the spindle motor be spun up to speed and undergo the use of the solenoid hammer as many times as required. Such a balancing process can take a significant amount of time thereby impacting the overall fabrication time of the disk drive. In this regard, there is a need in the art for an improved method of balancing a disk pack of a disk drive in comparison to the prior art.

SUMMARY OF THE INVENTION

An aspect of the present invention can be regarded as a method of balancing a disk pack for use in a disk drive. The disk pack includes a spindle motor and a rotatable disk. The spindle motor is configured to rotate the disk about an axis of rotation of the spindle motor. The spindle motor has a spindle motor imbalance location indicia upon the spindle motor indicative of a location of a spindle motor location imbalance. The method includes detecting the spindle motor imbalance location indicia. The method further includes placing the disk upon the spindle motor. The method further includes attaching the disk to the spindle motor with the disk being off-set from the axis of rotation based upon the detected spindle motor imbalance location indicia for balancing the disk pack by producing a disk off-set imbalance in relation to the axis of rotation.

According to various embodiments, an optical sensor may be used to detect the spindle motor imbalance location indicia. The spindle motor may have a spindle motor imbalance magnitude indicia upon the spindle motor indicative of a magnitude of a spindle motor location imbalance. The method may further include detecting the spindle motor imbalance magnitude indicia and attaching the disk to the spindle motor with the disk off-set from the axis of rotation based upon the detected spindle motor imbalance magnitude indicia for balancing the disk pack by producing a disk off-set imbalance in relation to the axis of rotation. An optical sensor may be used to detect the spindle motor imbalance magnitude indicia. The disk drive may include a disk drive base and the spindle motor may include a spindle motor hub. The method may further include attaching the spindle motor to the disk drive base and rotating the spindle motor hub in relation to the detected spindle motor imbalance location indicia and the disk drive base. In addition, the method may further include placing multiple disks upon the spindle motor and attaching the disks to the spindle motor with the disks off-set from the axis of rotation based upon the detected spindle motor imbalance location indicia for balancing the disk pack by producing a disk off-set imbalance in relation to the axis of rotation. A disk clamp may be used to attach the disk to the spindle motor.

The off-set may be maximized. For example, the spindle motor may include a spindle motor hub and the disk may include an inner edge. The method may include biasing a portion of the inner edge of the disk against a portion of the spindle motor hub based upon the detected spindle motor imbalance location indicia for balancing the disk pack by producing a disk off-set imbalance in relation to the axis of rotation. In another embodiment, the off-set may be minimized. For example, the method may include equally spacing the inner edge of the disk away from the spindle motor hub based upon the detected spindle motor imbalance location indicia for balancing the disk pack by producing a disk off-set imbalance in relation to the axis of rotation.

According to another aspect of the present invention, there is provided a disk drive including a disk drive base and a disk pack rotatably coupled to the disk drive base. The disk pack includes a rotatable disk and a spindle motor configured to rotate the disk about an axis of rotation of the spindle motor. The spindle motor has a spindle motor imbalance location indicia upon the spindle motor indicative of a location of a spindle motor location imbalance. The disk is attached to the spindle motor with the disk being off-set from the axis of rotation in relation to spindle motor imbalance location indicia for balancing the disk pack by producing a disk off-set imbalance in relation to the axis of rotation.

According to various embodiments, the spindle motor may have a spindle motor imbalance magnitude indicia upon the spindle motor indicative of a magnitude of a spindle motor location imbalance. The disk may be attached to the spindle motor with the disk off-set from the axis of rotation based upon the detected spindle motor imbalance magnitude indicia for balancing the disk pack by producing a disk off-set imbalance in relation to the axis of rotation. The disk drive may further include multiple disks upon the spindle motor. The disks may be attached to the spindle motor with the disks off-set from the axis of rotation in relation to the spindle motor imbalance location indicia for balancing the disk pack by producing a disk off-set imbalance in relation to the axis of rotation. The disk drive may further include a disk clamp for attaching the disk to the disk clamp with the disk between the disk clamp and the spindle motor. The spindle motor may include a spindle motor hub and the disk includes an inner edge. A portion of the inner edge of the disk is disposed against a portion of the spindle motor hub based upon the spindle motor imbalance location indicia for balancing the disk pack by producing a disk off-set imbalance in relation to the axis of rotation. In another embodiment, the inner edge of the disk may be equally spaced away from the spindle motor hub based upon the spindle motor imbalance location indicia for balancing the disk pack by producing a disk off-set imbalance in relation to the axis of rotation.

DESCRIPTION OF THE PREFERRED EMBODIMENTS

Figure 1:
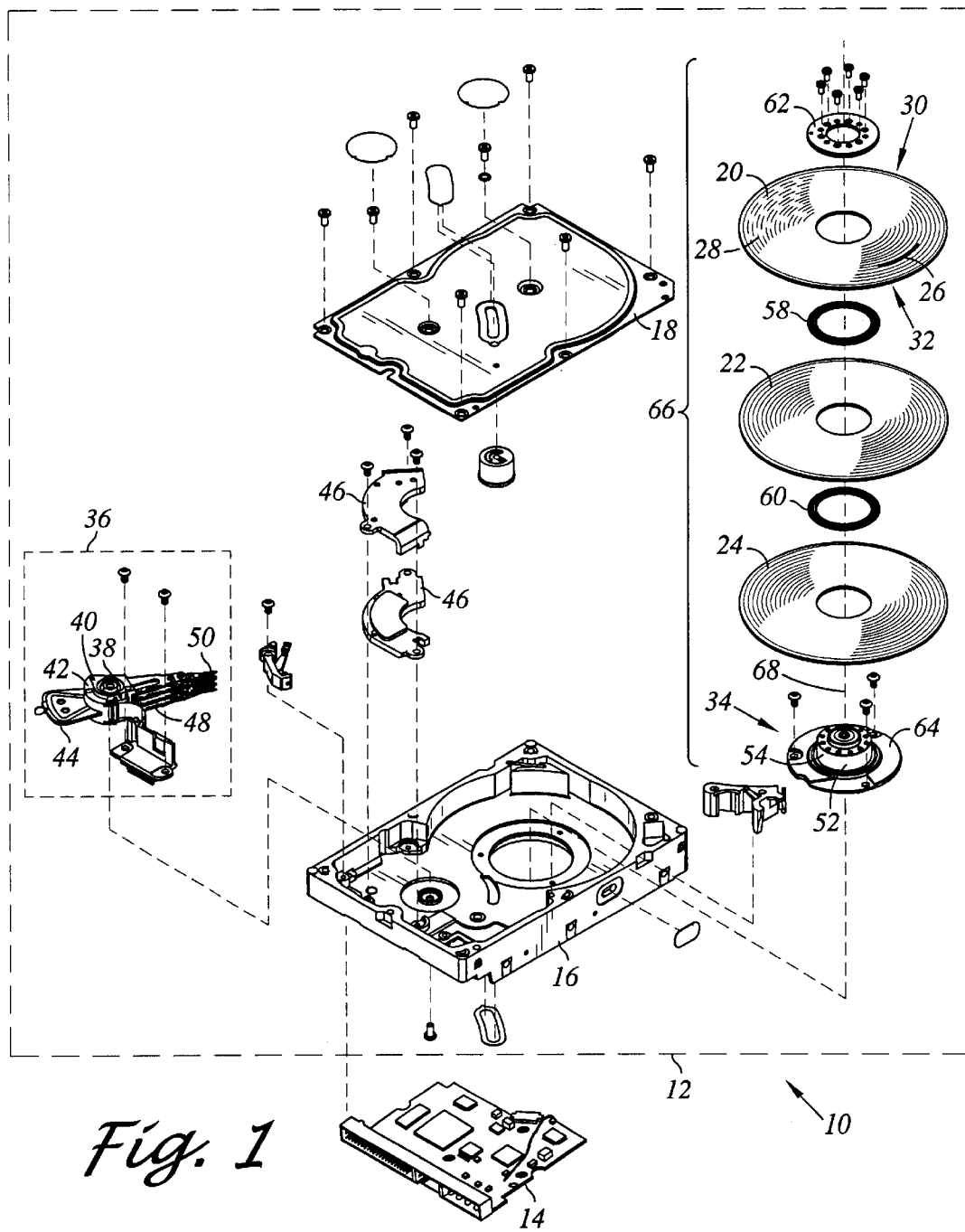
FIG. 1 is an exploded perspective view of a disk drive as constructed in accordance with an aspect of the present invention.

Referring now to the drawings wherein the showings are for purposes of illustrating preferred embodiments of the present invention only, and not for purposes of limiting the same, FIGS. 1–12 illustrate a method and disk drive in accordance with the aspects of the present invention.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a housing which may include a disk drive base 16 and a cover 18 that collectively house magnetic disks 20, 22, 24. Each magnetic disk 20, 22, 24 contains a plurality of tracks for storing data. The magnetic disks 20, 22, 24 may be two-sided, and thus for example, the magnetic disk 20 is shown having a track 26 on an upper facing side 30 and a track 28 (shown in phantom) on a lower facing side 32. The head disk assembly 12 further includes a spindle motor 34 for rotating the magnetic disks 20, 22, 24. The head disk assembly 12 further includes a head stack assembly 36 and a pivot bearing cartridge 38. The head stack assembly 36 includes a rotary actuator 40.

The rotary actuator 40 includes an actuator body 42 that has a bore and the pivot bearing cartridge 38 is engaged within the bore for facilitating the rotary actuator 40 to rotate between limited positions. The rotary actuator 40 further includes a coil portion 44 that extends from one side of the actuator body 42 to interact with a pair of permanent magnets 46 to form a voice coil motor for pivoting the rotary actuator 40. A plurality of actuator arms, the lowermost one of which being denoted 48, extend from an opposite side of the actuator body 42. As the disks 20, 22, 24 may be two sided, each of the actuator arms include either one or two head gimbal assemblies associated with the adjacent sides of the disks 20, 22, 24. Each head gimbal assembly includes an air bearing slider (the uppermost one being denoted 50). Each air bearing slider 50 is contemplated to include a transducer head for reading and writing data from and to the disks 20, 22, 24.

Figure 2:
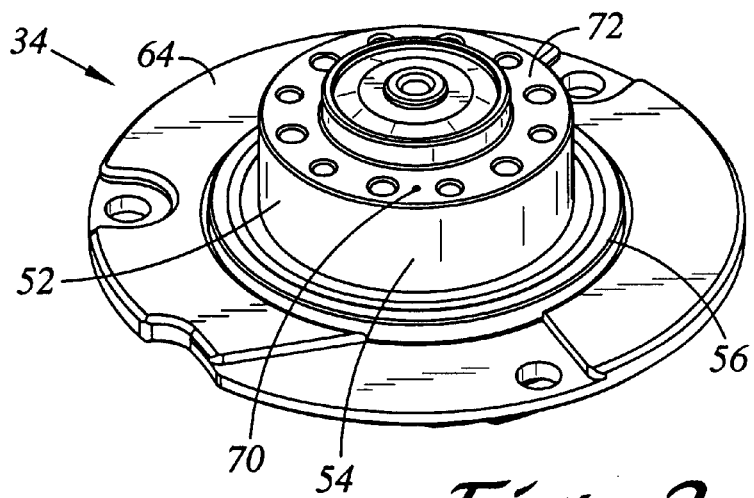
FIG. 2 is an enlarged perspective view of a spindle motor of the disk drive of FIG. 1.

The spindle motor 34 includes a spindle motor hub 52 that is rotatably attached to the disk drive base 16. Referring additionally to FIG. 2, the spindle motor hub 52 has a hub body 54 and a hub flange 56 that extends from the hub body 54. The hub flange 56 includes a supporting surface for supporting a lowermost one of the disks, namely disk 24. The remaining disks 22, 20 are stacked and separated with annular disk spacers 58, 60 that are disposed about the hub body 54. A disk clamp 62 is attached about the spindle motor hub 52 and is utilized to apply a clamping force against the topmost disk 20 for securing all the disks 20, 22, 24 to the spindle motor hub 52. The spindle motor 34 may further include a spindle motor base 64 that is mounted to the disk drive base 16. The various rotating members may be collectively referred to a disk pack 66. In this regard, the disk pack 66 may include the disks 20, 22, 24, the spindle motor hub 52, the disk spacers 58, 60 and the disk clamp 62.

Figure 3:
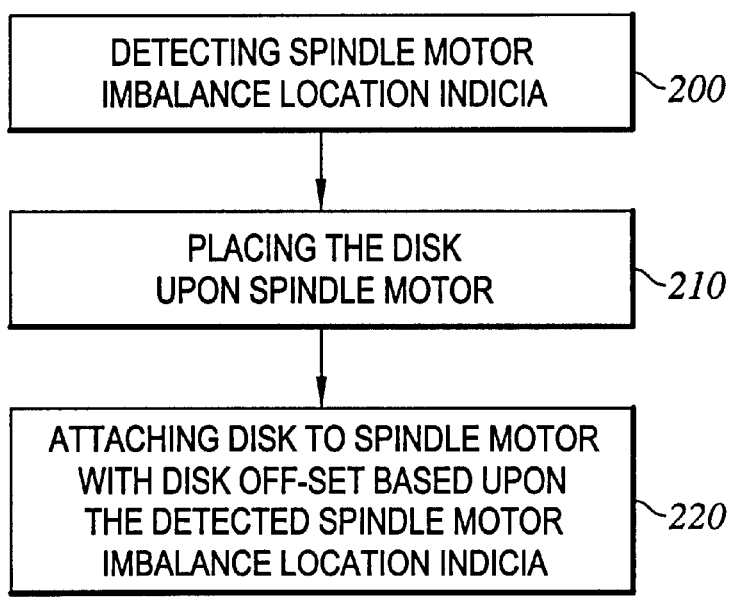
FIG. 3 is a flow chart of a method of balancing a disk pack of a disk drive in accordance with an aspect of the present invention.
Figure 10:
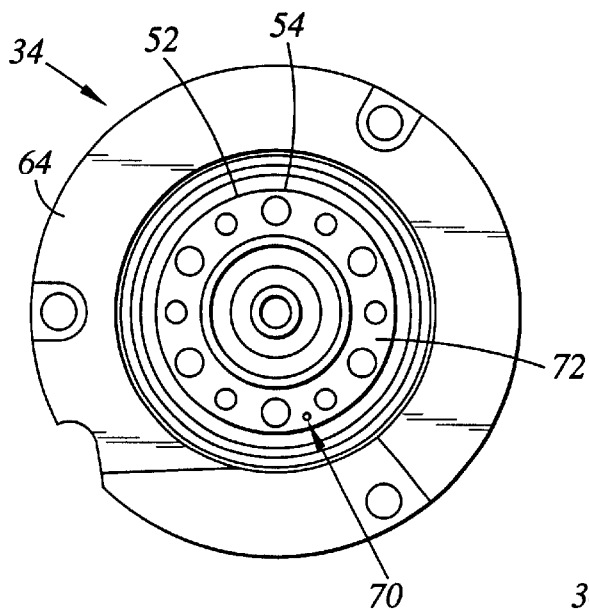
FIG. 10 is a top plan view of the spindle motor of FIG. 2
Figure 11:
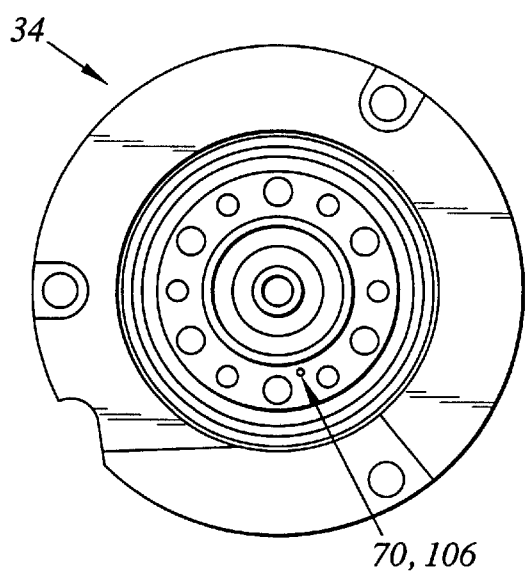
FIG. 11 is a top plan view of a spindle motor similar to that of FIG. 2, however, with a different spindle motor imbalance location indicia and a spindle motor imbalance magnitude indicia included.

Referring now additionally to FIG. 3, there is depicted a flow chart of a method of balancing a disk pack for use in a disk drive in accordance with an aspect of the present invention. An aspect of the present invention can be regarded as a method of balancing the disk pack 66 for use in the disk drive 10. The disk pack 66 includes the spindle motor 34 and a rotatable disk, such as disk 20. The spindle motor 34 is configured to rotate the disk 20 about an axis of rotation 68 of the spindle motor 34. As seen in FIGS. 2 and 10, the spindle motor 34 has a spindle motor imbalance location indicia 70 upon the spindle motor 34 indicative of a location of a spindle motor location imbalance. The method includes the step 200 of detecting the spindle motor imbalance location indicia 70. The method further includes step 210 of placing the disk 20 upon the spindle motor 34. The method further includes step 220 of attaching the disk 20 to the spindle motor 34 with the disk 20 being off-set from the axis of rotation 68 based upon the detected spindle motor imbalance location indicia 70 for balancing the disk pack 66 by producing a disk off-set imbalance in relation to the axis of rotation 68.

In further detail, it is contemplated that a disk drive manufacturer may receive from a supplier the spindle motor 34. In this regard, the disk drive manufacturer may assemble the spindle motor 34 into the rest of the disk drive 10. The spindle motor 34 may be initially received having the spindle motor location imbalance indicia 70 located upon it. In the embodiment shown, the spindle motor location imbalance indicia 70 is disposed upon a disk clamp surface 72 of the spindle motor hub 52.

Figure 4:
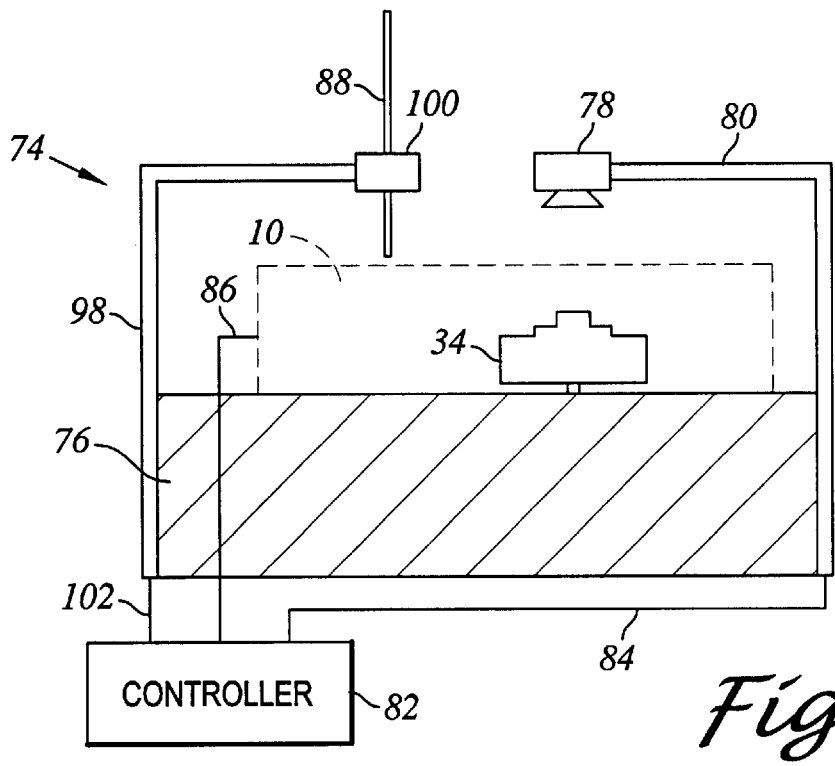
FIG. 4 is a symbolic illustration of a tooling station with a spindle motor of a disk drive (shown in phantom) as may be used in the method as illustrated in the flow chart of FIG. 3.
Figure 5:
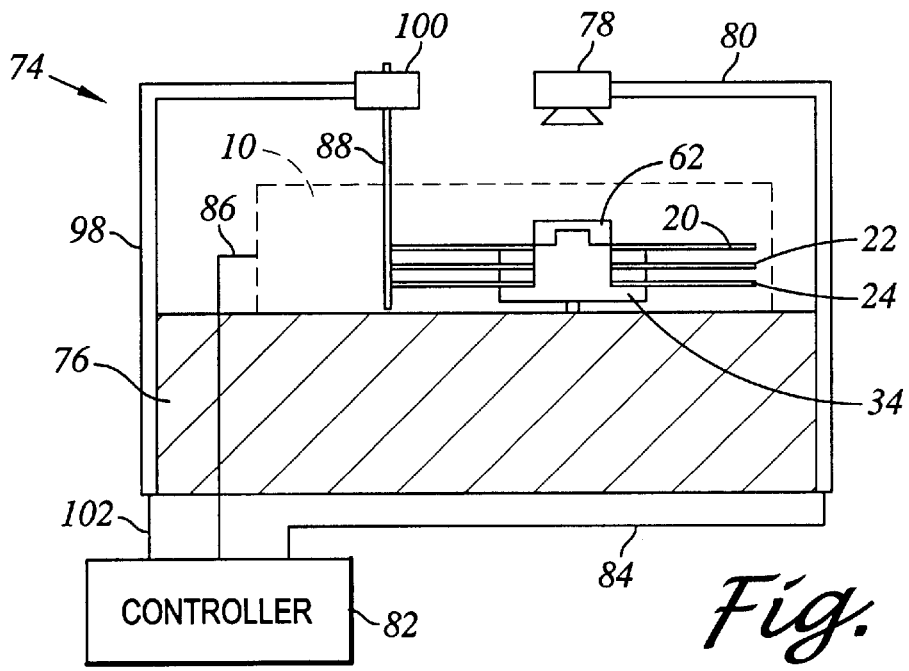
FIG. 5 is a symbolic illustration of the tooling station of FIG. 4 as shown with a disk attached to the spindle motor.

Referring now to FIGS. 4 and 5 there is symbolically illustrated a tooling station 74. The disk drive 10 (shown in phantom) is represented during its fabrication process. At this point, the disk drive 10 includes the spindle motor 34. The spindle motor 34 has a spindle motor imbalance location indicia 70 upon the spindle motor 34. The tooling station 74 may include a station base 76. The disk drive 10 is placed upon the station base 74. The tooling station 74 may include a sensor, such as an optical sensor 78 that is attached to the station base 76 with a sensor support 80. The optical sensor 78 may be used in step 200 to detect the spindle motor imbalance location indicia 70.

The tooling station 74 may further include a controller 82. The controller 82 is in electrical communication with the optical sensor 78 via connection 84. The controller 82 includes electronics for receiving optical data from the optical sensor 78 regarding the spindle motor imbalance location indicia 70 and determining the location of the spindle motor location imbalance. The controller 82 may further be connected to the disk drive 10 via connection 86. In particular, the controller 82 may be in electronic communication with the spindle motor 34.

Figure 6:
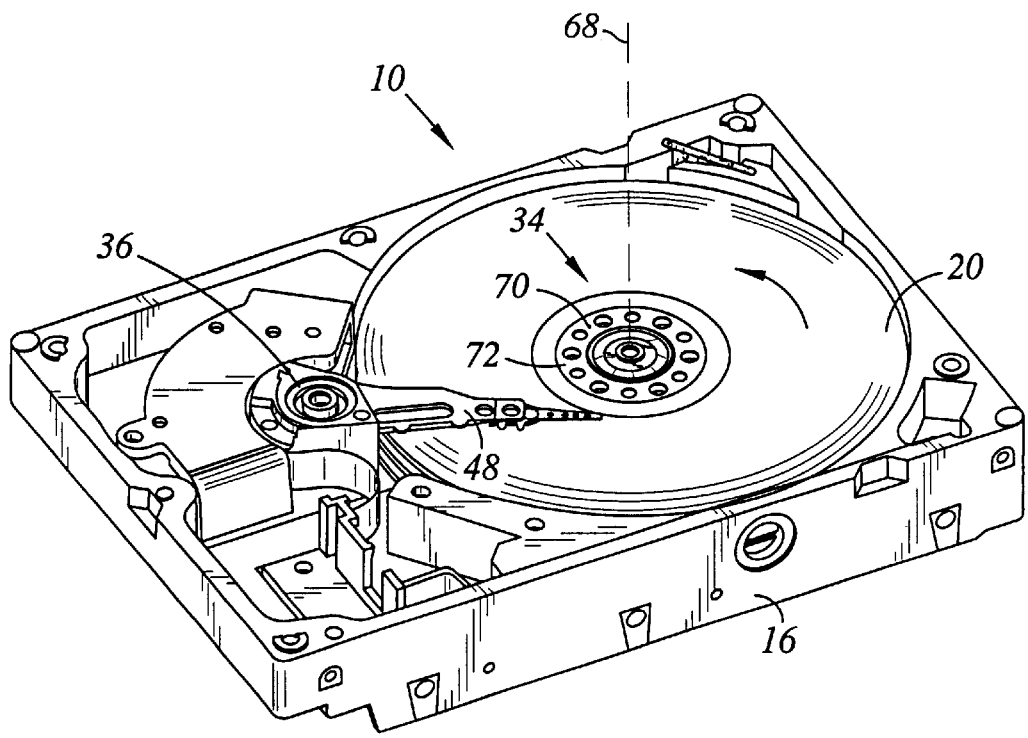
FIG. 6 is perspective view of the disk drive of FIG. 1, however, without a cover and a disk clamp.

Referring now to FIG. 5, there is symbolically illustrated the tooling station 74 and disk drive 10 of FIG. 4 with the disks 20, 22, 24 being disposed upon the spindle motor 34. At this point, having determined the location of the spindle motor imbalance, the controller 82 may then cause the disk drive to rotate the spindle motor 34 such that the spindle motor imbalance location indicia 70 is positioned at a predetermined angular location with respect to the rest of the disk drive 10 as well as in relation to a biasing pin 88 as shown in FIG. 5. This may be done prior to or after the disks 20, 22, 24 are placed upon the spindle motor 34. Referring now to FIG. 6 there is depicted a perspective view of the disk drive 10 at this point of the fabrication process.

Figure 8:
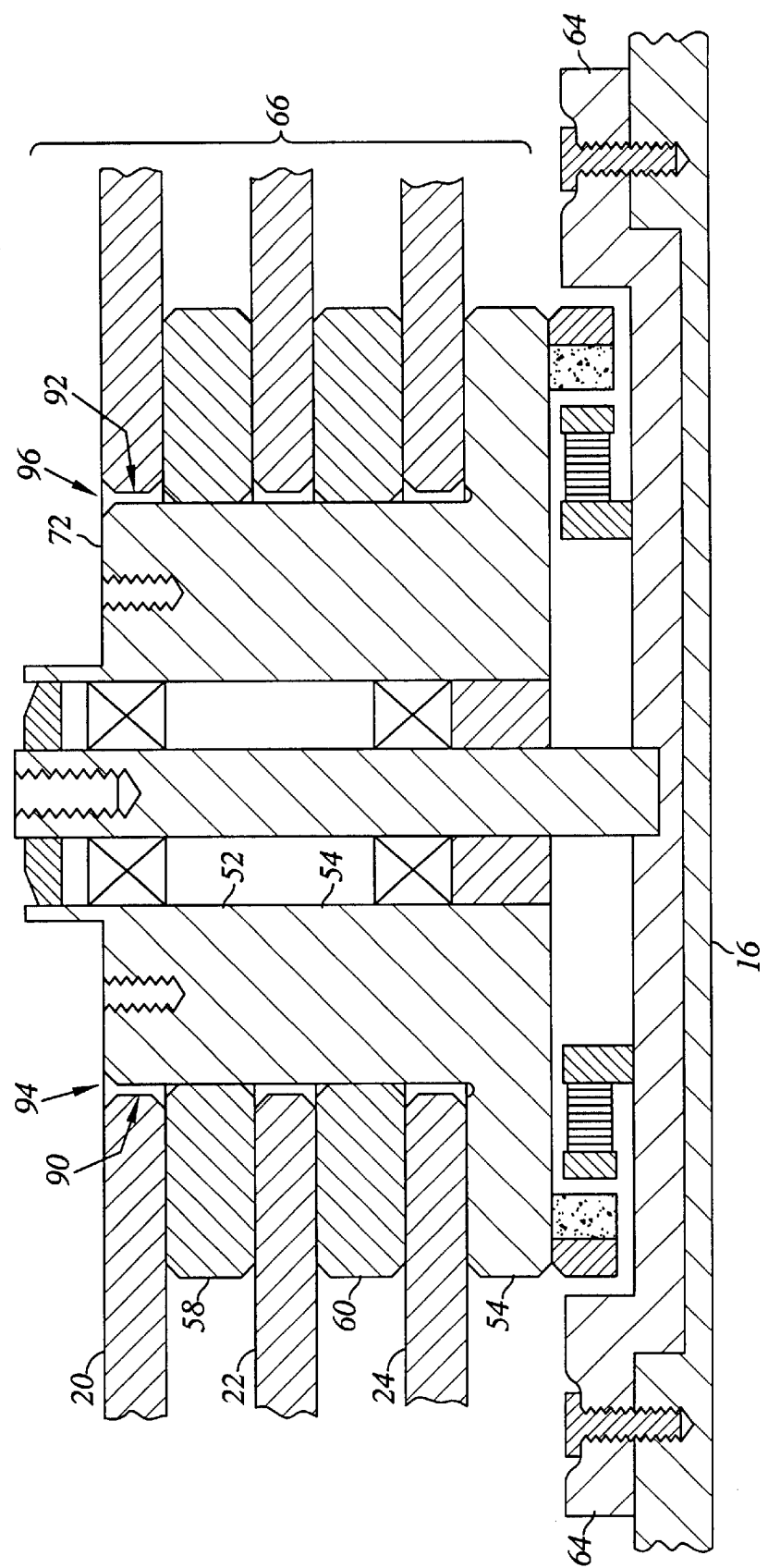
FIG. 8 is a cross-sectional side view of a portion of the disk drive depicting the installed spindle motor and disks of FIG. 6.

In further detail, referring now to FIG. 8 there is a cross sectional side view of a portion of the disk drive 10 which includes the disk pack 66 including the spindle motor 34 and disks 20, 22, 24. Step 210 of placing the disk 20, and in this embodiment, disks 20, 22, 24 upon the spindle motor 34 has been completed. It is contemplated that the disks 20, 22, 24 may each include an inner edge. The portion of the inner edge of disk 20 at the left is denoted 90 and the portion of inner edge of disk 20 at the right is denoted 92. A gap 94 is formed between the hub body 54 and the inner edge portion 90, and a gap 96 is formed between the hub body 54 and the inner edge portion 92.

Still referring to FIG. 5, the tooling station 82 may include the biasing pin 88 that is attached to the station base 76 with a pin support 98. The biasing pin 88 may be used in step 220. The biasing pin 88 may be positioned via an actuator 100 attached to the pin support 98. The controller 82 is in electrical communication with the actuator 100 via connection 102. The controller 82 includes electronics for controlling actuator 100.

Figure 7:
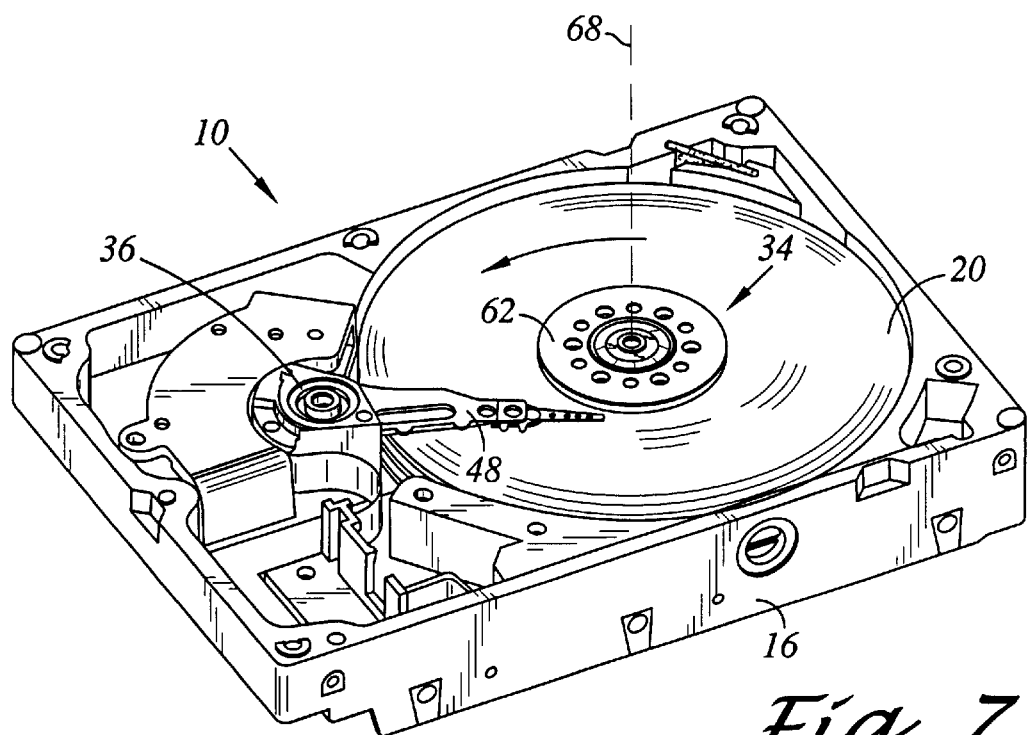
FIG. 7 is perspective view of the disk drive of FIG. 6, however, with a disk clamp.

The actuator 100 may be used to move the biasing pin 88 against the disks 20, 22, 24 to off-set the disks 20, 22, 24 from the axis of rotation 68 based upon the detected spindle motor imbalance location indicia 70 for balancing the disk pack 66 by producing a disk off-set imbalance in relation to the axis of rotation 68. Once the desired off-set is achieved, the disk clamp 62 may be attached to the spindle motor hub 52 for secure attachment of the disks 20, 22, 24 to the spindle motor 34. Referring now to FIG. 7 there is depicted a perspective view of the disk drive 10 at this point of the fabrication process.

Figure 9:
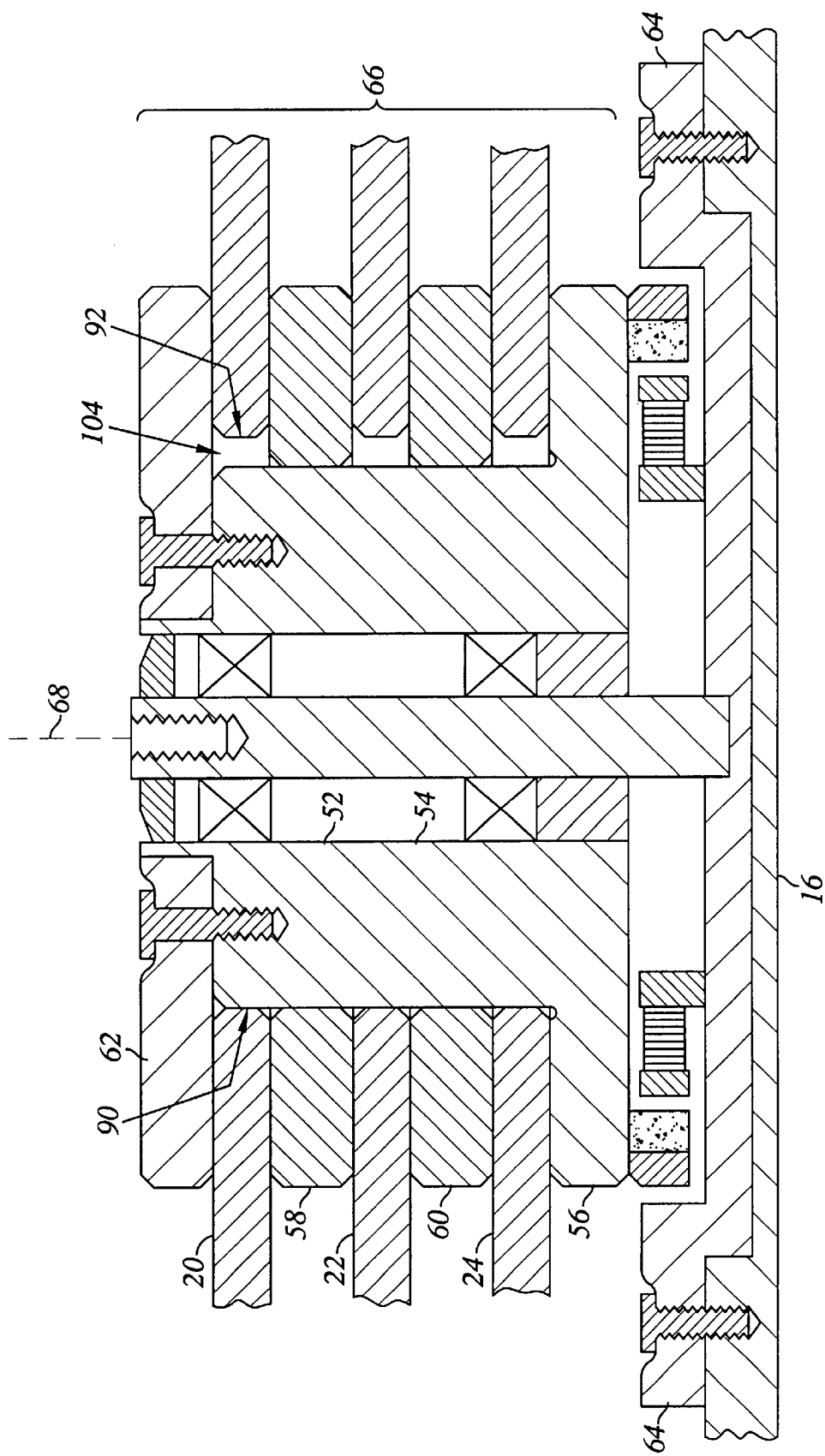
FIG. 9 is a cross-sectional side view of a portion of the disk drive of FIG. 7 with the disks being off-set and attached to the spindle motor with the disk clamp.

In further detail, referring now to FIG. 9 there is a cross sectional side view of a portion of the disk drive 10 of FIG. 8, however with the disks 20, 22, 24 being off-set from the axis of rotation 68. In this embodiment, the off-set is maximized with the inner edge portion 90 being disposed flush against the spindle motor hub body 54 and a gap 104 is at a maximum disposed at the inner edge portion 92.

To the extent that the spindle motor imbalance location indicia 70 indicates that the spindle motor 34 is substantially balanced (i.e., the imbalance being located adjacent the axis of rotation 68 or otherwise having a minimal amount of imbalance magnitude) then the disks 20, 22, 24 may be off-set from the axis of rotation 68 with a minimal value, i.e., the disks 20, 22, 24 being attached to the spindle motor 34 with the gaps 94, 96 being substantially equal. Alternatively, the method may provide minimizing the off-set by simply placing the disks 20, 22, 24 without any intentional biasing such as through use of the biasing pin 88 so as to allow for the disks 20, 22, 24 to be off-set from the axis of rotation 68 based upon a statistical norm. Alternatively, the disks 20, 22, 24 can be equally off-set or biased from the axis of rotation 68 at various equal angular intervals with respect to each other for collectively balancing the disk pack 66 by producing a disk off-set imbalance in relation to the axis of rotation 68.

It is contemplated that the forgoing methodology may provide efficient fabrication of the disk drive 10. In this regard, like prior art balancing methods, the disk drive 10 is required to be brought to a tooling station for attachment of the disks. However, the present method does not require any spin up of the spindle motor 34 to determine the location of any disk pack imbalance and thereby avoids such a time consuming process.

Figure 12:
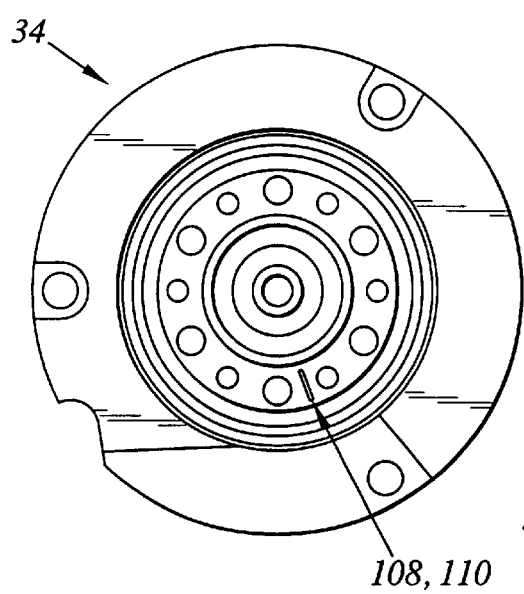
FIG. 12 is a top plan view of a spindle motor similar to that of FIG. 2, however, with a different spindle motor imbalance location indicia and a spindle motor imbalance magnitude indicia included.

The spindle motor imbalance location indicia 70 may take any number of forms. For example, the spindle motor imbalance location indicia 70 may be a hole, a depression, a scratch, a marking such as paint or ink or even a symbol with an indicated meaning related to the location of the spindle motor imbalance. In addition, the spindle motor 34 may have a spindle motor imbalance magnitude indicia 106 upon the spindle motor 34 indicative of a magnitude of a spindle motor location imbalance such as shown in the embodiment depicted in FIG. 11. In this regard, the spindle motor imbalance location indicia 70 and the spindle motor imbalance magnitude indicia 106 may be the same indicia. In this regard, the radial location of the spindle motor imbalance location indicia 70 and the spindle motor imbalance magnitude indicia 106 may be used to indicated a magnitude of the spindle motor imbalance. FIG. 12 depicts a spindle motor imbalance location indicia 108 and a spindle motor imbalance magnitude indicia 110 as indicated be a line segment. The length of the line segment may indicate a corresponding magnitude of the spindle motor imbalance.

The method may further include in step 200 detecting the spindle motor imbalance magnitude indicia (such as 106 or 110) and attaching the disks 20, 22, 24 to the spindle motor 34 with the disks 20, 22, 24 off-set from the axis of rotation 68 based upon the detected spindle motor imbalance magnitude indicia for balancing the disk pack 66 by producing a disk off-set imbalance in relation to the axis of rotation 68. The tooling station 74 described above may be used for this process.

According to another aspect of the present invention, there is provided the disk drive 10 including the disk drive base 16 and the disk pack 66 rotatably coupled to the disk drive base 16. The disk pack 66 includes a rotatable disk, such as any or all of disks 20, 22, 24, and the spindle motor 34 that is configured to rotate the disk 20 about the axis of rotation 68 of the spindle motor 34. The spindle motor 34 has the spindle motor imbalance location indicia 70 upon the spindle motor 34 indicative of a location of a spindle motor location imbalance. The disk 20 is attached to the spindle motor 34 with the disk 20 being off-set from the axis of rotation 68 in relation to spindle motor imbalance location indicia 70 for balancing the disk pack 66 by producing a disk off-set imbalance in relation to the axis of rotation 68. According to various embodiments, the disk drive 10 may include any combination of the forgoing described disk drive components.

We claim:

1. A method of balancing a disk pack for use in a disk drive, the disk pack including a spindle motor and a rotatable disk, the spindle motor being configured to rotate the disk about an axis of rotation of the spindle motor, the spindle motor having a spindle motor imbalance location indicia upon the spindle motor indicative of a location of a spindle motor location imbalance, the method comprising:

a) detecting the spindle motor imbalance location indicia;
   b) placing the disk upon the spindle motor; and
   c) attaching the disk to the spindle motor with the disk being off-set from the axis of rotation based upon the detected spindle motor imbalance location indicia for balancing the disk pack by producing a disk off-set imbalance in relation to the axis of rotation.

2. The method of claim 1 wherein step a) includes using an optical sensor to detect the spindle motor imbalance location indicia.

3. The method of claim 1 wherein the spindle motor has a spindle motor imbalance magnitude indicia upon the spindle motor indicative of a magnitude of a spindle motor location imbalance, step a) includes detecting the spindle motor imbalance magnitude indicia, and step c) includes attaching the disk to the spindle motor with the disk off-set from the axis of rotation based upon the detected spindle motor imbalance magnitude indicia for balancing the disk pack by producing a disk off-set imbalance in relation to the axis of rotation.

4. The method of claim 3 wherein step a) includes using an optical sensor to detect the spindle motor imbalance magnitude indicia.

5. The method of claim 1 wherein the disk drive includes a disk drive base and the spindle motor includes a spindle motor hub, step a) further includes attaching the spindle motor to the disk drive base and rotating the spindle motor hub in relation to the detected spindle motor imbalance location indicia and the disk drive base.

6. The method of claim 1 wherein step b) includes placing multiple disks upon the spindle motor, and step c) includes attaching the disks to the spindle motor with the disks off-set from the axis of rotation based upon the detected spindle motor imbalance location indicia for balancing the disk pack by producing a disk off-set imbalance in relation to the axis of rotation.

7. The method of claim 1 wherein step c) includes attaching a disk clamp to the spindle motor.

8. The method of claim 1 wherein the spindle motor includes a spindle motor hub and the disk includes an inner edge, step c) includes biasing a portion of the inner edge of the disk against a portion of the spindle motor hub based upon the detected spindle motor imbalance location indicia for balancing the disk pack by producing a disk off-set imbalance in relation to the axis of rotation.

9. The method of claim 1 wherein the spindle motor includes a spindle motor hub and the disk includes an inner edge, step c) includes equally spacing the inner edge of the disk away from the spindle motor hub based upon the detected spindle motor imbalance location indicia for balancing the disk pack by producing a disk off-set imbalance in relation to the axis of rotation.

10. A disk drive comprising:
    a disk drive base; and
    a disk pack rotatably coupled to the disk drive base, the disk pack including:
        a rotatable disk; and
        a spindle motor configured to rotate the disk about an axis of rotation of the spindle motor, the spindle motor having a spindle motor imbalance location indicia upon the spindle motor indicative of a location of a spindle motor location imbalance;
    wherein the disk being attached to the spindle motor with the disk being off-set from the axis of rotation in relation to spindle motor imbalance location indicia for balancing the disk pack by producing a disk off-set imbalance in relation to the axis of rotation.

11. The disk drive of claim 10 wherein the spindle motor has a spindle motor imbalance magnitude indicia upon the spindle motor indicative of a magnitude of a spindle motor location imbalance, the disk is attached to the spindle motor with the disk off-set from the axis of rotation based upon the detected spindle motor imbalance magnitude indicia for balancing the disk pack by producing a disk off-set imbalance in relation to the axis of rotation.

12. The disk drive of claim 10 further includes multiple disks upon the spindle motor, the disks are attached to the spindle motor with the disks off-set from the axis of rotation in relation to the spindle motor imbalance location indicia for balancing the disk pack by producing a disk off-set imbalance in relation to the axis of rotation.

13. The disk drive of claim 10 further includes a disk clamp for attaching the disk to the disk clamp with the disk between the disk clamp and the spindle motor.

14. The disk drive of claim 10 wherein the spindle motor includes a spindle motor hub and the disk includes an inner edge, a portion of the inner edge of the disk is disposed against a portion of the spindle motor hub based upon the spindle motor imbalance location indicia for balancing the disk pack by producing a disk off-set imbalance in relation to the axis of rotation.

15. The disk drive of claim 10 wherein the spindle motor includes a spindle motor hub and the disk includes an inner edge, the inner edge of the disk is equally spaced away from the spindle motor hub based upon the spindle motor imbalance location indicia for balancing the disk pack by producing a disk off-set imbalance in relation to the axis of rotation.

* * * * *